United States Patent
Donaldson

(10) Patent No.: US 11,945,322 B1
(45) Date of Patent: Apr. 2, 2024

(54) MAGNETO POWER GENERATOR

(71) Applicant: Richard C. Donaldson, Wentzville, MO (US)

(72) Inventor: Richard C. Donaldson, Wentzville, MO (US)

(*) Notice: Subject to any disclaimer, the term of this patent is extended or adjusted under 35 U.S.C. 154(b) by 0 days.

(21) Appl. No.: 18/506,848

(22) Filed: Nov. 10, 2023

(51) Int. Cl.
*B60L 53/24* (2019.01)
*B60L 53/22* (2019.01)
*H02K 7/00* (2006.01)

(52) U.S. Cl.
CPC .............. *B60L 53/24* (2019.02); *B60L 53/22* (2019.02); *H02K 7/006* (2013.01); *B60L 2210/30* (2013.01)

(58) Field of Classification Search
CPC ...... B60L 53/24; B60L 53/22; B60L 2210/30; H02K 7/006
See application file for complete search history.

(56) References Cited

U.S. PATENT DOCUMENTS

| | | | | |
|---|---|---|---|---|
| 5,513,719 A * | 5/1996 | Moroto | ..................... | B60K 6/24 903/952 |
| 5,638,935 A * | 6/1997 | Fehring | .................... | F16D 43/10 192/105 B |
| 6,279,711 B1 * | 8/2001 | Fehring | .................... | F16D 43/10 192/105 C |
| 6,536,574 B2 * | 3/2003 | Fehring | .................... | F16D 43/10 192/105 C |
| 8,662,221 B2 | 3/2014 | Ueno | | |
| 9,151,346 B2 * | 10/2015 | Fehring | .................... | F16D 43/18 |
| 2004/0012205 A1 | 1/2004 | Sua-An | | |
| 2007/0144283 A1 * | 6/2007 | Hasegawa | .............. | B60K 17/04 74/325 |
| 2010/0019722 A1 | 1/2010 | Sanchez | | |
| 2012/0031229 A1 * | 2/2012 | Venturi | ................. | B60W 10/06 903/909 |
| 2014/0274518 A1 * | 9/2014 | Fehring | .................... | F16D 43/10 474/152 |
| 2015/0191215 A1 * | 7/2015 | Kawakami | ............... | B62M 6/50 74/661 |

FOREIGN PATENT DOCUMENTS

| | | |
|---|---|---|
| CN | 201061156 Y | 5/2008 |
| CN | 111016670 A | 4/2020 |
| GB | 2591147 A | 7/2021 |
| JP | 3170663 U | 8/2011 |

* cited by examiner

*Primary Examiner* — Erez Gurari
(74) *Attorney, Agent, or Firm* — Charles McCloskey

(57) ABSTRACT

Magneto Power Generator has a magneto with a shaft mounted secondary pulley connected to a centrifugal clutch, a belt spanning from the secondary pulley to a primary pulley, the primary pulley fitting to an axle, a transformer, an inverter, and related wiring. The magneto has electrical communication through the transformer, then through the inverter, and to the battery of a vehicle. The primary pulley and the secondary pulley have a ratio of diameters for optimal current generation at moderately steady voltage. The centrifugal clutch disengages the secondary pulley when the vehicle goes into reverse. The grounded magneto produces alternating current transformed and inverted to direct current suitable for the vehicle's battery.

19 Claims, 2 Drawing Sheets

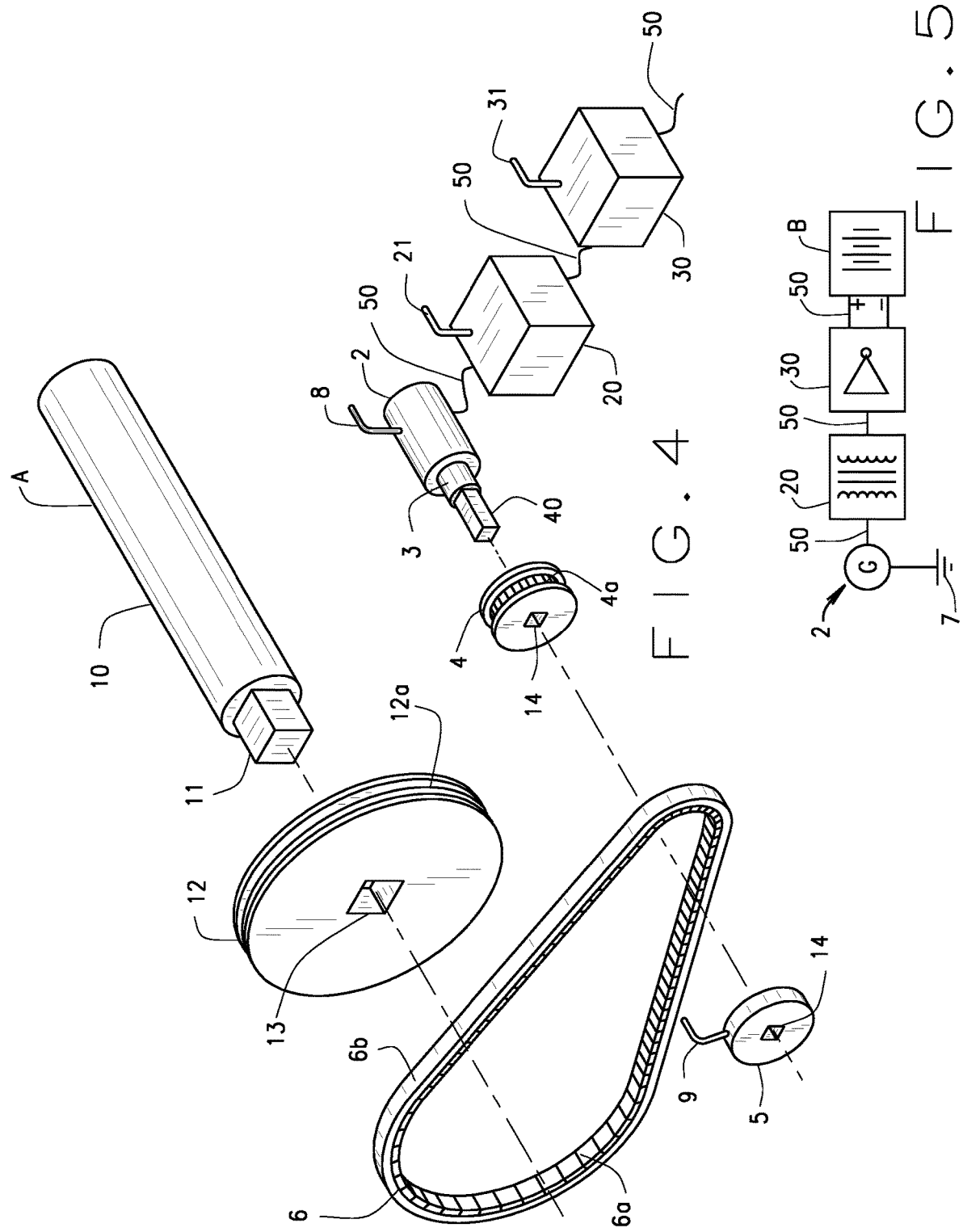

MAGNETO POWER GENERATOR

BACKGROUND OF THE INVENTION

The present invention relates to electrically powered vehicles in general and in particular provides a magneto protected from opposite rotation of a vehicle in reverse.

Through the centuries, chariots and wagons had horses and other animals as their motive power. Well trained horses, charioteers, and coachmen could attain speeds nearing twenty five miles per hour for short times. Fit horses and skilled wagon drivers could haul cargo fifty miles per day. A relay of horses and their riders could transmit a message across half a continent in less than a week. Horses though tired and required forage. With the advent of steam engines, people and companies sought faster transportation.

Steam engines lead to railroads. The steam engines called for strong chassis and that called for lengthy, straight, and flat roads. Steam engines did well pulling trains of cargo and passengers but fared less well in smaller vehicles. Almost alongside steam engines, internal combustion engines developed with the advent of petroleum. Those engine suggested new vehicles entirely.

After leaving the assembly line of Henry Ford, cars hit the road running. Early cars came in one color and had limited speed. Given nearly a century of time, two world wars, and engineering skill, cars have multiplied and evolved. Cars now operate in fleets and spur urban development. Whole highway systems now serve their needs from city to city, and coast to coast. Much like the beginning, cars and their cargo carrying kin, use internal combustion engines fueled by petroleum. Fuel mileage has increased in recent decades and yet people still use gasoline and diesel powered vehicles of all description.

Increasing fuel mileage has spurred development in lower weight vehicles and more aerodynamic vehicles. Weight and air resistance lessen fuel mileage so auto manufacturers seek to avoid them at every turn. Developments in direct current engines and battery storage have led to electric passenger vehicles hitting the road in the last twenty years. The electric cars have high aerodynamic shapes, batteries stored within a chassis and in a trunk, and direct current motors of few parts. Electric cars have commenced gaining motorist acceptance and now make up about three percent of annual vehicle sales. Throughout this application, where a masculine pronoun is used, the feminine pronoun is implied.

DESCRIPTION OF THE PRIOR ART

And yet, electric cars still do not fully utilize all of their energy. Electric cars have internal friction from motors through their transmissions to the tires themselves. Electric cars still face air resistance as they move forward at highway speeds and to some extent when they move in reverse.

Through the years, various people and firms have sought to recover energy as a vehicle moved forward. The patent publication to Spiteri, No. GB2591147, of the United Kingdom, describes a vehicle kinetic axis self-charger.

This publication then describes an onboard generator with a flywheel. The magnetic generator operatively connects to the non-drive wheels of an electric powered vehicle.

Next, the patent to Ueno, No. 8662221 provides an electric supply arrangement for an electric vehicle. This patent shows at least one tire with internal electrical power generating elements: a core and a coil. A roadside current induces power into the tire and then into the motor of the vehicle. Here, an augmented tire serves as a generator from nearby external current.

The patent publication to Sanchez, No. 2010/0019722 provides an electric vehicle regeneration component. This component has a sleeve upon an axle and the sleeve engages belts that then turn an alternator. The sleeve mounts to wheel plates generally inward from a tire.

The patent publication to Sua-An, No. 2004/0012205 provides a continuous energy supplier. In the publication, claim 1 uses the phrase "means that spins." Thus, the spin means a chain drive from an axle or drive shaft, or from a separate wheel.

Turning to the Chinese patent No. CN201061156, hereinafter the Chinese '156 patent, it has the title of Energy Transformation System And Equipment Having Rotary Motion Counterparts. This System uses the translated word magneto, as its part 3, upon a belt driven from a special shaped wheel hub. The hub has a shape that retains the belt upon it.

Then the Chinese patent No. CN111016670, hereinafter the Chinese '670 patent, has its title of New Energy Automobile That can Multimode Automatic Charging. This Automobile has wheels with a belt drive to a first generator, a wind driven second generator, and a solar panel on its roof.

And from Japan, the Japanese patent No. JP3170663, circa 2011, hereinafter the Japanese '663 patent, has its title of Electric Vehicle Power Generator. This patent shows a belt drive from a non-drive wheel to a generator. Though this patent mentions a belt drive, it has limited description of pulleys. This patent also shows a long belt from the rear axle to near a central motor. Such belts face de-tensioning during use.

While the above-described devices fulfill their respective particular objectives and requirements, the aforementioned devices do not describe a Magneto Power Generator. Therefore, a need exists for new and improved Magneto Power Generator that can be used for when vehicles go into reverse. In this regard, the present invention substantially fulfills this need. In this respect, the Magneto Power Generator according to the present invention substantially departs from the conventional concepts and designs of the prior art, and in doing so provides a device primarily developed for the purpose of lighting the cutting area of shears trimming the flowers and buds of *cannabis*.

The Magneto Power Generator overcomes the above-mentioned disadvantages and drawbacks of the prior art. As such, the general purpose of the present invention, which will be described subsequently in greater detail, is to provide new and improved Magneto Power Generator which has all the advantages of the prior art mentioned heretofore and many novel features that result in Magneto Power Generator which are not anticipated, rendered obvious, suggested, or even implied by the prior art, either alone or in any combination thereof.

SUMMARY OF THE INVENTION

The Magneto Power Generator has a magneto with a secondary pulley connected to a centrifugal clutch, a belt spanning from the secondary pulley to a primary pulley, the primary pulley fitting to an axle, a transformer, an inverter, and related wiring. The magneto has electrical communication through the transformer, then through the inverter, and to the battery of a vehicle. The primary pulley and the secondary pulley have a ratio of diameters for optimal current generation at moderately steady voltage. The centrifugal clutch disengages the secondary pulley when the vehicle goes into reverse. The grounded magneto produces alternating current transformed and inverted to direct current suitable for the vehicle's battery.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and the scope of the present invention.

It is therefore an object of the present invention to provide a new and improved Magneto Power Generator that may be easily and efficiently manufactured and marketed to the consuming public.

Still another object of the present invention is to provide a Magneto Power Generator that recovers energy from a moving vehicle.

Still another object of the present invention is to provide a Magneto Power Generator that installs near a shaft to a non-driving wheel of a vehicle.

Still another object of the present invention is to provide a Magneto Power Generator that disengages when a vehicle goes into reverse.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

In referring to the drawings,

FIG. 4 is an exploded view of the invention; and

FIG. 5 is a circuit diagram of the invention.

The same reference numerals refer to the same parts throughout the various figures.

DESCRIPTION OF THE PREFERRED EMBODIMENT

Figure 1:
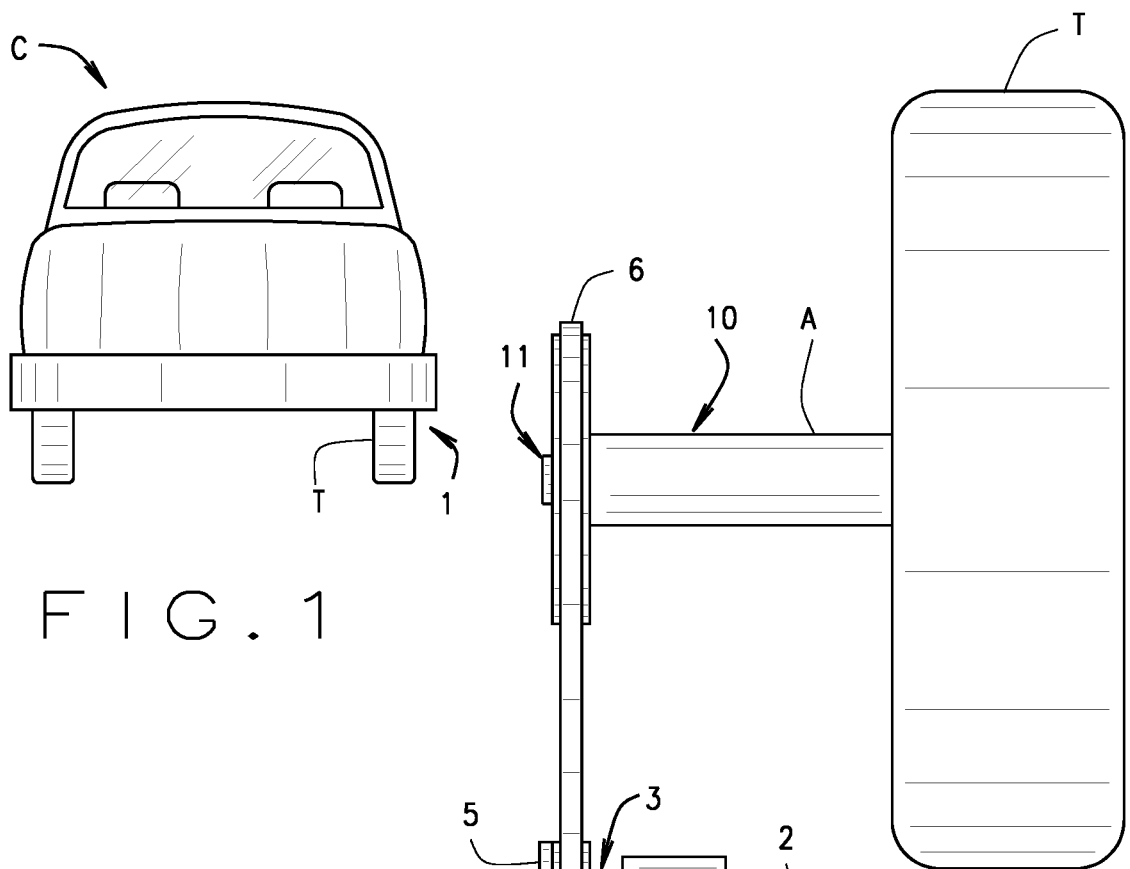
FIG. 1 is an environment view of the preferred embodiment of the present invention.

Referring now to the drawings, and particularly to FIGS. 1-5, a preferred embodiment of the Magneto Power Generator of the present invention is shown by the reference numeral 1. FIG. 1 shows a vehicle, here a car C with two nondriving wheels shown, each having a tire T. The invention 1 cooperates with one tire, here shown on the right of the figure. The rotation of the tire T during use imparts rotation into the invention that then generates electrical power at suitable properties for the vehicle, particularly its battery. The invention attaches to the body of the car, the frame of the car, or both. Though the invention has primary application upon an electric car, it may also see use with hybrid, gasoline, and diesel powered cars, vans, and light trucks.

As later shown and described, the invention utilizes a magneto that turns in one direction. The invention imparts rotation to the magneto when the vehicle C moves forward as the vehicle has more miles and operating hours going forward than in reverse. Because a vehicle as in C goes into reverse from time to time, such as when exiting a parking place, the invention protects the magneto from turning opposite its preferred direction of rotation. A magneto turning opposite its preferred direction risks generating charge out of the desired phase and other electrical properties, and mechanical failure of the magneto's internal components, not shown.

Figure 2:
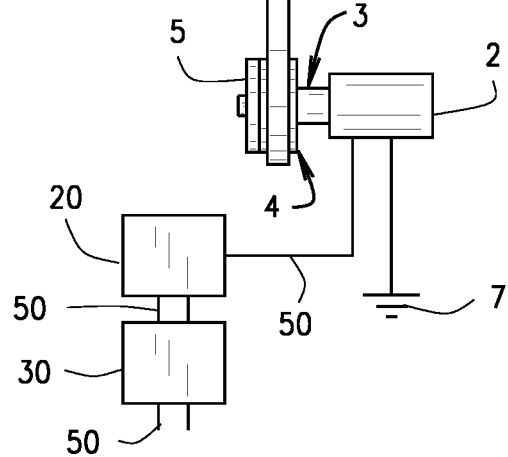
FIG. 2 is a top view of the invention.

Turning to FIG. 2, it shows the invention 1 inside of one wheel well of a car, not shown. The car has a tire T as before, but the tire T fits upon a rim that connects to a suspension system and a braking system, both not shown for clarity. The tire T upon a rim has the rim turn upon an axle A with an end 10 opposite the tire T. Upon the end 10, the axle A has a tip 11 to which fits a primary pulley 12 as later shown. A serpentine belt 6 fits around the primary pulley. The serpentine belt can also be called a flexible elongated member. The serpentine belt has a reinforced outer surface shown and a geared or a grooved inner surface, not shown, that contacts the primary pulley. Thus as the tire T turns upon a road, the tire rotates the rim which turns the axle A and its end 10 that imparts rotation through its tip 11 to the primary pulley and into the belt 6.

The belt turns itself to a centrifugal clutch 5 operatively connected to a secondary pulley 4 that receives or engages the inner surface 6a of the belt 6. The secondary pulley sliding engages a shaft 3 that turns a magneto 2. Rotation of the magneto creates alternating current proportional to the revolutions per minute of the shaft and the windings within the magneto. The magneto has its ground as at 7, generally to the body of a the car, not shown. The current departs the magneto through wiring 50 to a transformer 20 that steps down the voltage to less than 15 volts for ultimate delivery to a battery of the car. The transformed current then departs the transformer through further wiring 50 to an inverter 30. The inverter makes the alternating current from the magneto into direct current suitable for charging the battery of the car. The magneto electrically communicates to the transformer which electrically communicates to the inverter which electrically communicates to the battery charging system of the car. The inverter, as the last component of the invention before the battery charging system, delivers the electrical power to that system enroute to the car's battery.

Figure 3:
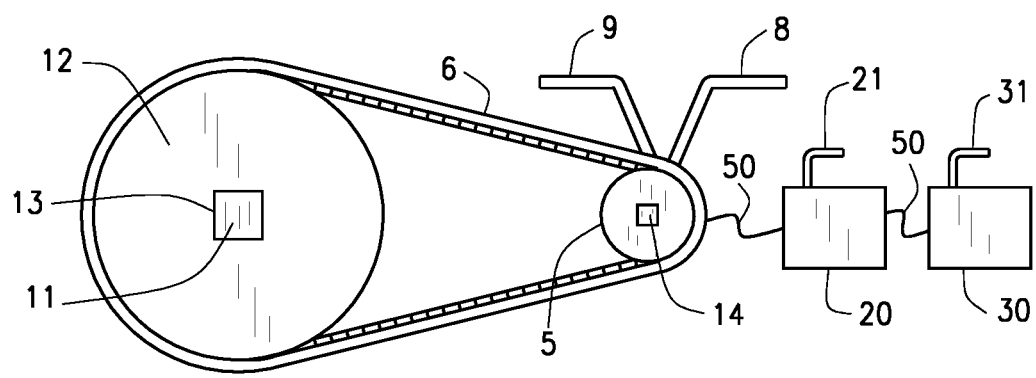
FIG. 3 is a side view of the invention.

As mentioned above, a car drives most of its miles in a forward direction with appropriate gearing. From time to time, a car goes into reverse such as when leaving a garage, leaving a parking space, and backing away from a pothole, an obstruction, or an accident. A car of an office worker likely enters reverse at least three times per work day: leaving home, leaving the office for lunch, and leaving the office to return home. The belt, the primary pulley, and the secondary pulley turn to capture motion from the car C going forward and impart that to the magneto. However, a magneto turns in one direction thus when a car C enters reverse damage may occur to the magneto and the secondary pulley. Thus, the invention has a centrifugal clutch 5 that connects with the secondary pulley 4. The centrifugal clutch engages the secondary pulley when the car C goes forward thus in FIG. 2 the primary pulley and the secondary pulley both turn clockwise —a primary direction-when viewed from the right, or outside, of the tire T. When the car C goes into reverse, the primary pulley and the secondary pulley both turn counterclockwise —a secondary directions. This prompts the centrifugal clutch 5 to disengage the secondary pulley from the shaft 3 thus preventing the magneto from turning and damaging itself Turning to FIG. 3 showing the invention from the side, the tip 11 at the end 10 of the axle A has a polygonal shape, here shown as square. The tip engages a keyway 13, or key, centered in the primary pulley 12. The tip and keyway cooperate so that the round primary pulley remains fixed in rotation upon the tip 11 of the end 10, typically round, of the axle. The fixed primary pulley 12 imparts rotation from the tip 11 into the belt 6. The belt has a continuous serpentine form with a cross section compatible with the sheaves of the primary pulley 12 and of the secondary pulley 4. The belt travels through the sheaves of both pulleys 12, 4 without slipping, or jumping out of them.

The belt departs from the primary pulley 12 and travels to the secondary pulley 4 here shown into the plane of the figure behind the clutch 5. The secondary pulley has its keyway 14 that cooperatively engages the clutch 5 and the shaft 3, particularly its second tip 40, so that the secondary pulley rotates the shaft without loss of revolutions per minute when the C goes forward. Meanwhile, the clutch 5 prevents the shaft 3 from rotating when the car C goes into reverse, here, counterclockwise in this view. The shaft 3 extends further into the plane of the figure to the magneto, not shown. The magneto has a first bracket 8 extending outwardly for connection into the structure of the car, or vehicle. The clutch 5 has a fourth bracket 9 also extending outwardly for its connection into the car's structure. Thus, the magneto and the clutch have securement against improper rotation. Though this description refers to clockwise and counterclockwise in coordination with the figures, installation of the invention upon other wheels of a car may call for a mirror image of the description and the figures.

As before, the magneto creates current that it delivers through wiring 50 to the transformer 20 and that passes through wiring 50 to the inverter 30. The transformer has its second bracket 21 that connects it to the car's structure and the inverter has its third bracket 31 that connects it to the structure of the car, typically proximate the transformer.

The primary pulley 12 has its diameter $d_1$ and the secondary pulley also has its diameter $d_2$ where $d_1$ exceeds that of $d_2$. Thus the invention has a speed ratio of $d_1/d_2$ imparted by the belt to the magneto. The maximum operating rotation rate of the shaft 3 of the magneto 2 sets the maximum operating speed ratio. From that, the invention has a primary pulley 12 of suitable diameter that turns the secondary pulley 4 at no more than the maximum revolutions per minute of the magneto. The desired voltage produced by the magneto and suitable for the car's batter charging system also guides selection of primary pulley diameter $d_1$ and of secondary pulley diameter $d_2$ as discussed below related to FIG. 5.

Having touched on the invention components in FIGS. 1-3, FIG. 4 provides an exploded view of the invention. The invention begins towards the top of the FIG. with the end 10 of the axle A. The end has its tip 11, here shown square, that fits into the keyway 13 of the primary pulley 12. The primary pulley has its outer surface, or sheave as at 12a, with linear grooves, transverse teeth, or transverse ribs, that receive or engage the inner surface, as at 6a of the belt 6. The secondary pulley has its outer surface, or sheave as at 4a, also with linear grooves, transverse teeth, or transverse ribs, that receive or engage the belt's inner surface. The inner surface of the belt has circumferential ribs that cooperate with linear grooves in the sheave 12a or transverse ridges that also cooperate with teeth in the sheave 12a.

The clutch 5 appears outwardly of the belt 6 as it does not directly engage the belt, as that occurs with the secondary pulley 4. The clutch has a generally round shape and its fourth bracket for securing the structure of the car C. The clutch may have a keyway 14 for its cooperative engagement with the secondary pulley 4 and a second tip 40 upon the shaft 3 away from the magneto 2. The second tip 40 engages the keyway 14 as shown.

The invention captures mechanical energy from the rotating axle and converts it into electrical energy as shown in FIG. 5. The invention has its ground, as at 7, for the grounded magneto 2 connected through wiring to the transformer 20. The magneto produces up to of 101V AC at up to 4001 revolutions per minute (rpm), 1V AC at a minimum of 100 rpm, and preferably at 12V AC at 50 Watts at 2300 rpm. The wiring delivers the electricity to the transformer at the magneto voltage and then transformer reduces that voltage to approximately 12V AC. The transformer has its primary winding and secondary winding where the primary winding receives the voltage load from the magneto and where the secondary winding delivers a voltage suitable for the battery charging system of the car C. The electricity leaves the transformer still as alternating current over wiring to the inverter 30. The inverter then conditions the electrical power taking it from alternating current to direct current suitable for delivery charge into a battery B of the car C. Though this figure and FIG. 4 show the transformer and inverter as separate items, they may have a compact form suitable for placement within the frame or the body of the car C.

In an alternate embodiment, the transformer 20 includes a capacitor that stores electrical charge from the magneto, at its various rotational speeds, or rpm. When the capacitor reaches a suitable amount of charge, it releases the charge into the inverter 30 for delivery into the car's battery charging system. The capacitor has a rating of no more than 70 microfarad (mfd) because of its storage and dampening role.

In an alternate embodiment, the inverter 30 or the transformer 20 includes circuitry and detectors that measure the car's battery charge. Upon measuring battery charge at optimal level, the inverter ceases delivery of charge from the invention to the car's battery charging system. This circuitry and detectors avoid overcharging the car's battery.

In an alternate embodiment, ground 7 includes a strap or other contact device from the invention to a road surface. The strap or other contact device then discharges surplus electrical charge from the invention into a road surface. The Applicant notes that friction and other road hazards will wear down the strap and thus suggests users of the invention replace the strap or other contact device at a regular interval.

The risk of overcharging calls to mind another risk: overheating of a car's battery. In a further alternate embodiment, the invention includes a supplemental cooling fan that provides cooling of a car's —particularly an electric car's— battery and battery compartment. The cooling fan also disperses unwanted gases in the battery compartment.

The invention operates as an electrical power generating device upon a vehicle with an axle. The invention has a magneto with a centrifugal clutch, a shaft that has a secondary pulley and a second tip where the secondary pulley receives a the belt, and the centrifugal clutch operatively connects to the secondary pulley. The belt then operatively connects to the centrifugal clutch and then to the axle at its tip. The invention then has a transformer in electrical communication with a magneto and an inverter in electrical communication with the transformer. The inverter actually delivers electrical power to the charging system of the vehicle. The primary pulley actually connects to the axle upon its end with a tip. The primary pulley also has a centered keyway to receive the tip, so the primary pulley remains fixed to the axle. The belt once more actually connects the primary pulley to the secondary pulley and turning the magneto. The belt rotates in a primary direction corresponding to when the vehicle goes forward. The secondary pulley also has its centered keyway that receives a second tip, so the second pulley remains fixed to the shaft. As expected, the second tip extends to the centrifugal clutch that prevents rotation of the shaft when the belt rotates in a secondary direction corresponding to when the vehicle goes in reverse. To accommodate the belt, the primary pulley has its sheave with one of transverse ribs, transverse teeth, and circumferential grooves and the secondary pulley has its sheave too with one of transverse ribs, transverse teeth, and circumferential grooves. The belt has its inner surface that engages or mates with the sheave of the primary pulley and the sheave of the secondary pulley. The belt's inner surface has one of ribs, notches, and grooves cooperatively engaging the sheave of the primary pulley and the sheave of the secondary pulley. The primary pulley has its diameter, and the secondary pulley has its diameter wherein the diameter of the primary pulley exceeds the diameter of the secondary pulley. The secondary pulley rotates the magneto upon engagement of the centrifugal clutch. With the components working together, the shaft of the magneto rotates between 100 revolutions per minute and up to 4001 revolutions per minute and it produces between 1V AC and up to 100V AC. Subject to smoothing by the transformer, inverter, and an alternate capacitor.

While a preferred embodiment of the Magneto Power Generator has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The Magneto Power Generator may have plastic, PVC, plastic, polymer, metal, composite, or another variety of hybrid material may be used in any of the invention's components. The components of the invention form complete circuits in electrical communication. The invention has a construction of a sturdy, lightweight material that resists water, ultraviolet light, road salt, road de-icing chemicals, tar, and other road hazards.

Although providing a Magneto Power Generator, it should be appreciated that the Magneto Power Generator herein described is also suitable for a variety of vehicles that operate on roads and also go into reverse from time to time. Those include cars, trucks, vans, golf carts, carts, and the like where a Magneto Power Generator user can put them to work.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like —when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. An electrical power generating device upon a vehicle, said vehicle having an axle, comprising:
   a magneto having a centrifugal clutch;
   a belt operatively connecting to said centrifugal clutch, said belt operatively connecting to the axle;
   a transformer in electrical communication with said magneto;
   an inverter in electrical communication with said transformer; and
   wherein said inverter is adapted to deliver electrical power to a battery charging system of the vehicle.

2. The electrical power generating of claim 1 further comprising:
   said magneto having a shaft, said shaft having a secondary pulley and said secondary pulley receiving said belt, and said centrifugal clutch operatively connecting to said secondary pulley;
   a primary pulley adapted to connect to the axle; and
   said belt operatively connecting said primary pulley to said secondary pulley and turning said magneto, wherein said belt rotates in a primary direction corresponding to when the vehicle goes forward.

3. The electrical power generating of claim 2 further comprising:
   the axle having an end, said end having a tip;
   said primary pulley having a centered keyway receiving said tip, wherein said primary pulley remains fixed to said tip;
   said shaft having a second tip;
   said secondary pulley having a centered keyway receiving said second tip, wherein said second pulley remains fixed to said shaft; and
   said second tip extending to said centrifugal clutch;
   wherein said centrifugal clutch prevents rotation of said shaft when said belt rotates in a secondary direction corresponding to when the vehicle goes in reverse.

4. The electrical power generating of claim 3 further comprising:
   said primary pulley having a sheave with one of transverse ribs, transverse teeth, and circumferential grooves; and
   said secondary pulley having a sheave with one of transverse ribs, transverse teeth, and circumferential grooves.

5. The electrical power generating of claim 4 further comprising:
   said belt having an inner surface, said inner surface engaging said sheave of said primary pulley and said sheave of said secondary pulley; and
   said inner surface having one of ribs, notches, and grooves cooperatively engaging said sheave of said primary pulley and said sheave of said secondary pulley.

6. The electrical power generating of claim 3 further comprising:
   said primary pulley having a diameter and said secondary pulley having a diameter wherein said diameter of said primary pulley exceeds said diameter of said secondary pulley;
   said secondary pulley engaging said centrifugal clutch, said centrifugal clutch then rotating said shaft of said magneto; and
   said shaft of said magneto reaching at least 100 revolutions per minute and said magneto producing at least 1V AC.

7. The electrical power generating of claim 6 further comprising:
   said shaft of said magneto reaching up to 4001 revolutions per minute and said magneto producing up to 101V AC.

8. The electrical power generating of claim 6 further comprising:
   said shaft of said magneto preferably rotating at 2300 revolutions per minute and said magneto producing 12V AC.

9. The electrical power generating of claim 3 further comprising:
   said magneto having a first bracket adapted to connect to the vehicle, said transformer having a second bracket adapted to connect to the vehicle, said inverter having a third bracket adapted to connect to the vehicle, and said centrifugal clutch having a fourth bracket adapted to connect to the vehicle.

10. An electrical power generating device upon a vehicle, said vehicle having an axle, said vehicle moving either forward or reverse, comprising:
    a centrifugal clutch adapted to connect to the vehicle, a secondary pulley coaxial with said centrifugal clutch and joining to said centrifugal clutch, a shaft connecting coaxially to said secondary pulley, and said shaft turning a magneto;
    a primary pulley adapted to connect to the axle, said primary pulley rotating about an axis, said secondary pulley rotating about an axis, wherein the axis of rotation of said primary pulley is parallel to the axis of rotation of said secondary pulley;
    a belt operatively connecting to said primary pulley to said secondary pulley and turning said magneto, wherein said belt rotates in a primary direction corresponding to when the vehicle goes forward;
    a transformer in electrical communication with said magneto;
    an inverter in electrical communication with said transformer; and
    wherein said inverter is adapted to deliver electrical power to the charging system of the vehicle.

11. The electrical power generating device of claim 10 further comprising:
    the axle having an end, said end having a tip;
    said primary pulley having a centered keyway receiving said tip, wherein said primary pulley remains fixed to the axle;
    said shaft having a second tip;
    said secondary pulley having a centered keyway receiving said second tip, wherein said second pulley remains fixed to said shaft; and
    said second tip extending into said centrifugal clutch;
    wherein said centrifugal clutch prevents rotation of said shaft when said belt rotates in a secondary direction corresponding to when the vehicle goes in reverse.

12. The electrical power generating device of claim 11 further comprising:
    said primary pulley having a sheave with one of transverse ribs, transverse teeth, and circumferential grooves; and
    said secondary pulley having a sheave with one of transverse ribs, transverse teeth, and circumferential grooves.

13. The electrical power generating device of claim 12 further comprising:

said primary pulley having a diameter and said secondary pulley having a diameter wherein said diameter of said primary pulley exceeds said diameter of said secondary pulley;

said secondary pulley rotating said magneto upon engagement of said centrifugal clutch; and said shaft of said magneto turning between 100 revolutions per minute and 4001 revolutions per minute and said magneto producing between 1V AC and 100V AC.

14. The electrical power generating device of claim 13 further comprising:

said shaft of said magneto reaching up to 4001 revolutions per minute and said magneto producing up to 100V AC.

15. The electrical power generating device of claim 14 wherein said shaft of said magneto rotates at 2300 revolutions per minute and said magneto produces 12V AC.

16. The electrical power generating device of claim 13 further comprising:

said transformer smoothing current from said magneto and stepping down current to between 1V AC and 20V AC; and said inverter delivering between 1V DC and 20V DC.

17. The electrical power generating device of claim 13 further comprising:

said magneto, said transformer, said inverter, and said centrifugal clutch each is adapted to connect to the vehicle.

18. An electrical power generating device upon a vehicle, said vehicle having an axle, comprising:

a magneto having a centrifugal clutch, a shaft, said shaft having a secondary pulley and a second tip, and said secondary pulley receiving said belt, and said centrifugal clutch operatively connecting to said secondary pulley;

a belt operatively connecting to said centrifugal clutch, said belt operatively connecting to the axle;

a transformer in electrical communication with said magneto;

an inverter in electrical communication with said transformer, wherein said inverter is adapted to deliver electrical power to the charging system of the vehicle;

a primary pulley adapted to connect to the axle;

the axle having an end, said end having a tip;

said primary pulley having a centered keyway receiving said tip, wherein said primary pulley remains fixed to the axle;

said belt operatively connecting said primary pulley to said secondary pulley and turning said magneto, wherein said belt rotates in a primary direction corresponding to when the vehicle goes forward;

said secondary pulley having a centered keyway receiving said second tip, wherein said second pulley remains fixed to said shaft;

said second tip extending to said centrifugal clutch;

wherein said centrifugal clutch prevents rotation of said shaft when said belt rotates in a secondary direction corresponding to when the vehicle goes in reverse;

said primary pulley having a sheave with one of transverse ribs, transverse teeth, and circumferential grooves;

said secondary pulley having a sheave with one of transverse ribs, transverse teeth, and circumferential grooves;

said belt having an inner surface, said inner surface engaging said sheave of said primary pulley and said sheave of said secondary pulley;

said inner surface having one of ribs, notches, and grooves cooperatively engaging said sheave of said primary pulley and said sheave of said secondary pulley;

said primary pulley having a diameter and said secondary pulley having a diameter wherein said diameter of said primary pulley exceeds said diameter of said secondary pulley;

said secondary pulley rotating said magneto upon engagement of said centrifugal clutch; and said shaft of said magneto rotating between 100 revolutions per minute and up to 4001 revolutions per minute and said magneto producing between 1V AC and up to 100V AC.

19. The electrical power generating of claim 18 further comprising:

said magneto, said transformer, said inverter, and said centrifugal clutch each having a mechanical connection to the vehicle.

* * * * *